United States Patent [19]

Higham et al.

[11] Patent Number: 4,860,543
[45] Date of Patent: * Aug. 29, 1989

[54] VIBRATION ISOLATION SYSTEM FOR A LINEAR RECIPROCATING MACHINE

[75] Inventors: Graham J. Higham, Ashland; Ronald N. Morris, Acton; Gerald R. Pruitt, Mendon, all of Mass.

[73] Assignee: Helix Technology Corporation, Waltham, Mass.

[*] Notice: The portion of the term of this patent subsequent to Nov. 15, 2005 has been disclaimed.

[21] Appl. No.: 239,436

[22] Filed: Sep. 1, 1988

Related U.S. Application Data

[63] Continuation of Ser. No. 894,777, Aug. 8, 1986, Pat. No. 4,783,968.

[51] Int. Cl.$^4$ ............................................. F25B 9/00
[52] U.S. Cl. ................................. 62/6; 62/295; 62/297; 248/636; 248/638; 417/901
[58] Field of Search ............... 62/6, 295, 296, 297; 417/901; 248/636, 638

[56] References Cited

U.S. PATENT DOCUMENTS

| | | | |
|---|---|---|---|
| 1,731,540 | 10/1929 | Powell . | |
| 2,468,900 | 5/1949 | Thiry . | |
| 3,742,729 | 7/1973 | Zulliger | 62/514 R |
| 3,910,729 | 10/1975 | Jepsem et al. | 417/417 |
| 4,092,833 | 6/1978 | Dusenec | 62/6 |
| 4,216,505 | 8/1980 | Grant et al. | 248/636 X |
| 4,360,087 | 11/1982 | Curwen | 417/363 X |
| 4,363,217 | 12/1982 | Venuti | 62/55.5 |
| 4,394,819 | 7/1983 | Averill | 62/514 R |
| 4,450,665 | 5/1984 | Corey | 62/6 X |
| 4,458,489 | 7/1984 | Walsh | 62/6 X |
| 4,539,822 | 9/1985 | Sundquist | 417/901 X |
| 4,610,143 | 9/1986 | Stofli et al. | 62/6 |
| 4,783,968 | 11/1988 | Higham et al. | 62/6 |

FOREIGN PATENT DOCUMENTS 692713 6/1940 Fed. Rep. of Germany .
82/00099 10/1982 PCT Int'l Appl. .

OTHER PUBLICATIONS

Daniels, A. "Magnetically Suspended Stirling Cryogenic Space Rerigeration": Stats Report-Advances in Cryogenic Engineering, vol. 27, 711–719 1982.

Gasser, May "Developments Toward Achievement of a 3–5 Year Lifetime Stirling Cycle Refrigerator for Space Applications" pp. 103–115, 1980.

Venuti, Guy S. "Use of Vibration-Isolated Cryopumps to Improve Electron Beam Lithography Units" *J. Vac. Sri. Technol* pp. 237–240 Apr.–Jun. 1983.

F. Stolfi and A. K. de Jonge, "Stirling Cryogenerators with Linear Drive", *Philips Technical Review*, vol. 42, No. 1, Apr. 1985, pp. 1–10.

*Primary Examiner*—Ronald C. Capossela
*Attorney, Agent, or Firm*—Hamilton, Brook, Smith & Reynolds

[57] ABSTRACT

A two mass vibration isolator particularly suited to a linear reciprocating machine. Vibration into and out of the machine is attenuated by an isolator placed between the machine and its mounting frame. The isolator is an elastomer with a damping ratio of at least 0.1 sandwiched between two retainers.

11 Claims, 2 Drawing Sheets

VIBRATION ISOLATION SYSTEM FOR A LINEAR RECIPROCATING MACHINE

This application is a continuation of application Ser. No. 06/894,777, filed Aug. 8, 1986 now U.S. Pat. No. 4,783,968.

BACKGROUND

The present invention relates to a two mass isolator system for a linear reciprocating machine such as a compressor. Vibration isolation generally refers to the means used to reduce the transmittance of vibration of one body to another. In linear reciprocating machines, mechanical vibration is generated by a piston or pistons reciprocating back and forth creating a resulting force on its cylinder. To reduce this mechanical vibration, a two mass isolator system employing a dynamic absorber and an isolator is typically used to absorb the vibration. The result is an attenuation of vibration generated by the machine that would otherwise be transmitted to the frame of the machine.

The advantage of the two-mass vibration isolator over a conventional single-mass isolator is that they are capable of reducing transmissibility more effectively. The characteristics of a two-mass system also differ from the mass-elastic in that the two-mass system has two resonant frequencies. Within a small band of frequencies between the two resonant frequencies and at frequencies above the highest resonance the transmissibility of the two-mass system is smaller than that of the simple single-mass isolator having similar stiffness.

SUMMARY OF THE INVENTION

The conventional method of designing a two-mass system is to consider only the vibration produced by the machine. No consideration is given to vibration transmitted from the mounting frame of the machine to the machine. If vibration resonating at frequencies equal to the isolator system's two resonant frequencies is transmitted to the machine, these vibrations will be amplified. Thus, there is a need to design a two-mass isolator system which attenuates vibration introduced into the machine as well as attenuating vibration produced by the machine.

The present invention relates to an isolator system for a machine having a linear reciprocating piston and is particularly suited to a compressor for a cryogenic refrigerator. The isolator system comprises a counterbalance mass attached to the machine and an isolator positioned between the machine and its mounting frame. The counterbalance mass is tuned to vibrate out of phase with the movement of the reciprocating piston. If properly tuned, the counterbalance force will be equal and opposite to the net unbalanced force produced by the compressor pistons. The isolator is dampened to a damping ratio of at least 0.1 to attenuate resonant frequencies associated with the reciprocating piston and the counterbalance mass.

In a preferred embodiment, the isolator is formed by sandwiching an elastomer between two retainers. Preferably, one end of the elastomer is bonded to one of the retainers and the other end of the elastomer to the end of the remaining retainer. The advantage of this construction is that a soft spring results in one direction such as axially while a stiff spring results in another direction such as radial.

BRIEF DESCRIPTION OF THE DRAWINGS

The foregoing and other objects, features and advantages of the invention will be apparent from the following more particular description of the preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention relates to an isolator system for a linear reciprocating machine such as a cryocooler or cryogenic refrigerator. Such refrigerators depend on a linear motor system to control the movement of a piston or pistons in the compressor and that of a displacer. For example, see U.S. patent application Ser. No. 885,218, of G. Highman et al., filed July 14, 1986, entitled "Cryogenic Refrigeration System Having An Involute Laminated Stator for Its Linear Drive Motor" now U.S. Pat. No. 4,761,960, which describes a linear motor used for compressing helium gas.

Figure 1:
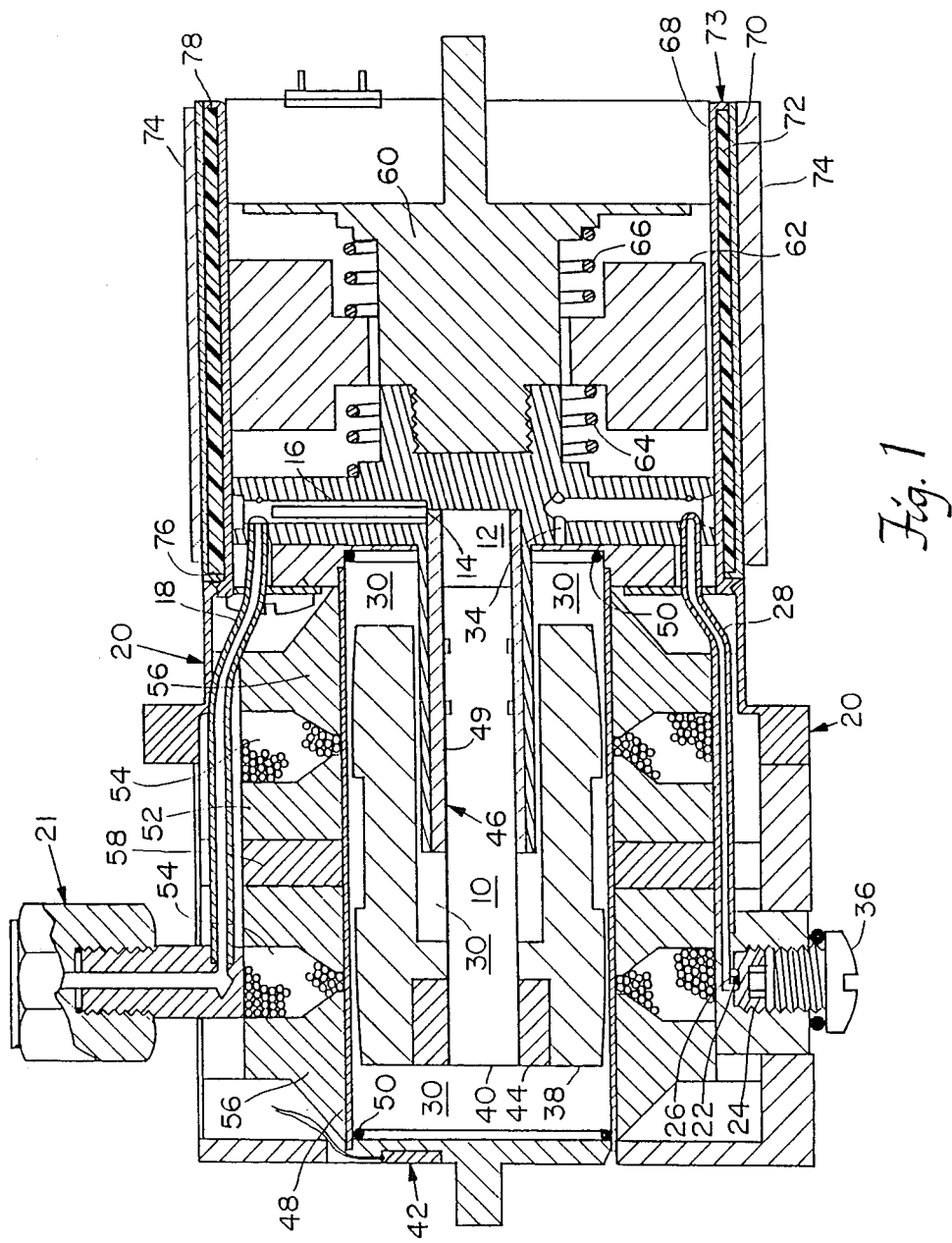
FIG. 1 is a cross sectional view of a linear compressor.

A preferred linear motor compressor embodying the suspension system is shown in FIG. 1. As shown, this compressor comprises a reciprocating piston element 10 which compresses helium gas in a compressor head space 12. From the head space 12 the gas passes through a port 14 in the compression chamber to a tube 16 which extends from the compression chamber to a preformed tube 18 which runs along an outer housing 20 to a gas fitting assembly 21. From the gas fitting assembly 21, gas is delivered to a cold finger of a cryogenic refrigerator such as a split Stirling refrigerator in which a displacer is housed (not shown).

The outer housing 20 provides for a ball 22 and retainer screw 24 assembly. The ball 22 and screw 24 assembly permits easy charging of the compressor with helium gas through a port 26 in the housing. The gas is allowed to communicate with a dead space 30 of the piston cylinder through a port 34 which is in communication with a second preformed tube 28. During the compressor operation, however, the ball 22 is fixed against the housing 20 by the retainer screw 24 to close the port 26. A protective dust cover screw 36 is provided to prevent dirt and debris from entering the ball 22 and screw 24 assembly.

The piston element 10 comprises an iron mass 38 fixed to a piston core 40. Iron is used because of its high magnetic permeability and high magnetic induction; however, other materials having the same characteristics may be used. Preferably, the core 40 is made of cermet but a tungsten alloy may be incorporated to give more mass for resonant operation. In order to detect the position of the piston element a sensor 42 is used to detect a target magnet 44 fitted at one end of the piston assembly 10. Preferably, the piston element is closely fitted within a chamber cylinder 46 to provide a clearance seal therebetween. It is preferred that a sleeve 49 made of ceramic, line the chamber cylinder 46; however, other hard, low friction materials such as cermet may be used.

Surrounding the piston assembly 10 just described is a pressure housing 48. The size of the pressure housing is constructed to allow helium gas in the dead space 30 to flow freely between the pressure housing 48 and the iron mass 38 as the piston assembly 10 shuttles back and forth. To prevent the piston assembly 10 from overstroking and causing possible damage, two O-rings 50 are positioned on each side of the piston assembly 10.

A stator 52 is located around the perimeter of the pressure housing 48. The stator 52 comprises two coils 54 positioned between involute laminations 56 and separated by a magnet 58. This static assembly is further described in U.S. Pat. No. 4,761,960 by G. Higham et al., recited above, which is incorporated herein.

As a consequence of the piston element 10 reciprocating back and forth, mechanical vibrations are produced by the compressor. To eliminate the vibrations, a passive vibration absorber or dynamic absorber 60 is attached to one end of the compressor and is tuned to resonate at the same frequency as the compressor's operating frequency. Preferably, the dynamic absorber 10 comprises a counterbalance mass 62 positioned between two springs 64 and 66 having small dampening characteristics; however, other arrangements may be used. If the dynamic absorber 60 is properly tuned, the force acting on the compressor due to the motion of the counterbalance mass 62 of the absorber 60 will be equal and opposite to the net unbalanced force produced by the compressor's piston. Thus, as a result, the axial motion of the compressor is countered by the axial vibration from the counterbalance mass 62 of the absorber 60.

Surrounding the counterbalance mass 62 is an inner retainer 68. This inner retainer 68 is constructed to allow enough clearance space for the counterbalance mass 62 to resonate and allow minimum dampening as the mass vibrates. Sandwiched between an outer retainer 70 and the inner retainer 68 which forms part of the outer housing 20 is an elastomeric material 72 such as silicon rubber. This sandwich construction serves as an isolator 73 between the compressor and a mounting frame 74.

Preferably, the elastomeric material is bonded to the retainers 68 and 70 in such a way that one end of the elastomer 76 is bonded to one of the retainers and the other end 78 is bonded to the other retainer. The radially directed surfaces of the elastomer are not bound to the retainers. This allows the elastomeric material to "float" on the inner and outer diameter of the retainers 70 and 68, respectively. The benefit of this construction is that the isolator provides for a stiff structure for attenuating any vibration that is along the radial direction of the compressor while providing a soft spring for attenuating vibration along the axial direction of the piston. The stiff structure results because there is a very wide section of elastomer that is short in radial length that can be compressed in the radial direction. Thus, the stiffness or softness of the spring constant of the isolator can be controlled by varying the thickness or length of the isolator assembly. Preferably, the inner and outer retainer are 0.02 inches thick and the elastomer is 0.06 inches thick.

The problem with the design of conventional two-mass vibration isolators for linear motors is that its construction only deals with vibration transmitted by the compressor. Therefore, to achieve the greatest attenuation possible, the conventional systems employ an undamped isolator in conjunction with a dynamic absorber. In other words, the spring rate of the isolator is set to determine the resonant frequency and damping was intentionally kept low to maximize the attenuation of the vibration at the operating frequency which resulted in a low damping ratio in the order of magnitude of 0.01. The damping ratio is defined as the dampening force divided by the spring force. What these systems overlook, however, is that harmful frequencies can be introduced into the compressor through the mount. If vibration is transmitted to the isolator system from the mounting frame at a frequency equal to one of the resonant frequencies of the system, a secondary amplified frequency would be introduced into the counterbalance mass system. This secondary frequency could then cause other components in the compressor to bottom out, thus introducing further vibrations.

To attenuate vibrations that would cause secondary frequencies to be transmitted to the compressor, we found it necessary to sacrifice the rate of attenuation of vibrations transmitted by the compressor. We accomplished this tradeoff by applying a dampener to the isolator 73.

Figure 2:
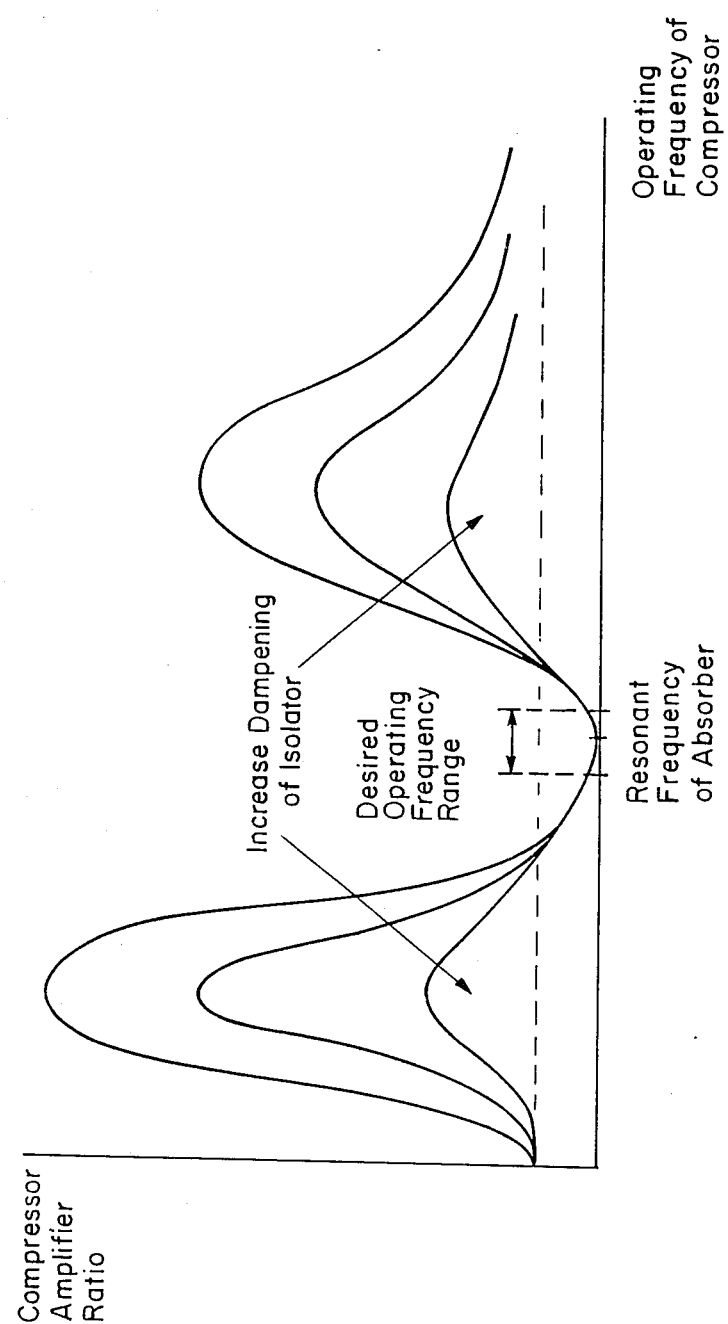
FIG. 2 is a characteristic curve of a two-mass vibration isolator system.

In FIG. 2 characteristic curves of a two mass vibration isolator system are shown. The curves show two humps which depict amplification of vibration at the system's two resonant frequencies. As the dampening characteristics of the isolator are increased the vibrations at these frequencies are attenuated. We have found that an isolator having a damping ratio of 0.5 results in a transmissibility ratio of 1. This implies that the vibration at the resonant frequencies are neither attenuated nor amplified. Achieving an isolator having a damping ratio of 0.5 may be impractical; but, we have found that a damping ratio of 0.1 or greater is acceptable and over 0.2 is preferred. An additional feature shown by FIG. 2 is that the tolerance of the compressor's operating frequency is increased when the resonant frequency of the isolator is substantially lower than the operating frequency range of the compressor. This acceptable operating frequency range is observed to be directly related to ratio of the absorber resonant frequency or nominal operating frequency to the isolator resonant frequency. The advantage of increasing the operating frequency band is that it becomes easier to overcome minor flaws in manufacturing the compressor.

Thus, our system effectively attenuates vibration into and out of the compressor system. The dampened isolator which is soft in the axial direction forces the left resonant frequency shown in FIG. 2 to be lower in frequency while dampening frequencies which are transmitted at that frequency. This construction also benefits the tolerance of the operating frequency by creating a larger operational frequency band. A stiff isolator is still maintained to attenuate vibration transmitted along the radial direction which is less sensitive to the operation of the compressor.

While the invention has been particularly shown and described with references to preferred embodiments thereof, it will be understood by those skilled in the art that various changes in the form and detail may be made without departing from the spirit and scope of the invention as described in the appended claims. For example, the length and width of the isolator may be designed to attenuate particular frequencies.

We claim:

1. A vibrating isolation system for a compressor having a linear reciprocating compressor piston comprising:

(a) a dynamic absorber tuned to resonate at the same frequency as the compressor's operating frequency; and (b) an isolator having a damping ratio of 0.1 or greater secured between the compressor and a mounting frame for attenuating vibrations transmitted into and out of the compressor.

2. A vibrating isolation system for a compressor as claimed in claim 1 wherein the damping ratio is 0.2.

3. A vibrating isolation system for a compressor as claimed in claim 1 wherein the isolator is comprised of an elastomer such that a soft spring is constructed in one direction and a stiff spring is constructed in another direction.

4. A vibrating isolation system for a compressor as claimed in claim 3 wherein the soft spring is constructed in an axial direction and the stiff spring is constructed in a radial direction relative to the reciprocating piston.

5. A vibrating isolation system for a compressor as claimed in claim 1 wherein the isolator attenuates resonant frequencies transmitted from the mounting frame to the compressor.

6. A vibrating isolation system for a compressor having a linear reciprocating compressor piston as claimed in claim 1 wherein the dynamic absorber has little or no damping characteristics.

7. An isolator for a linear reciprocating machine comprising:

(a) an elastomer to absorb vibration of the machine having an axis of reciprocation;

(b) two retainers sandwiching the elastomer therebetween; and (c) means for bonding one end of the elastomer to one of the retainers and the other end to the remaining retainer such that a soft spring is constructed along the machine axis and a stiff spring is constructed in another direction.

8. An isolator as claimed in claim 7 wherein the elastomer has a damping ratio of 0.1 or greater.

9. An isolator for a linear reciprocating machine comprising:

(a) an elastomer;

(b) two retainers with the elastomer sandwiched therebetween; and (c) means for bonding one end of the elastomer to one retainer and the other end to the remaining retainer such that a soft spring is constructed in an axial direction of the reciprocating machine and a stiff spring is constructed in a radial direction.

10. A vibrating isolation system for a compressor having a linear reciprocating piston comprising:

(a) a dynamic absorber tuned to resonate at the same frequency as the compressor's operating frequency; and (b) an isolator secured between the compressor and a mounting frame having a high damping ratio for attenuating vibrations transmitted into and out of the compressor.

11. A vibrating isolation system for a compressor having a linear reciprocating piston as claimed in claim 10 wherein the resonant frequency of the isolator is substantially lower than the resonant frequency of the dynamic absorber.

* * * * *